US006701157B2

(12) United States Patent
Shields

(10) Patent No.: US 6,701,157 B2
(45) Date of Patent: Mar. 2, 2004

(54) TRANSMITTER CIRCUIT ARCHITECTURE AND METHOD FOR REDUCING IN-BAND NOISE IN POINT TO MULTIPOINT COMMUNICATION SYSTEMS

(75) Inventor: Nicholas Paul Shields, Calgary (CA)

(73) Assignee: Harris Corporation, Melbourne, FL (US)

( * ) Notice: Subject to any disclaimer, the term of this patent is extended or adjusted under 35 U.S.C. 154(b) by 258 days.

(21) Appl. No.: 09/891,396

(22) Filed: Jun. 27, 2001

(65) Prior Publication Data

US 2003/0171103 A1 Sep. 11, 2003

(51) Int. Cl.[7] .................................................. H04B 7/00
(52) U.S. Cl. ........................ 455/522; 455/69; 455/127.2
(58) Field of Search ........................ 455/522, 69, 232.1, 455/234.1, 234.2, 249.7, 127.1, 127.2, 67.11, 67.13, 114.2, 115.1

(56) References Cited

U.S. PATENT DOCUMENTS 5,507,017 A * 4/1996 Whitmarsh et al. ......... 455/126
5,914,947 A * 6/1999 Saito ........................... 370/337
6,118,988 A * 9/2000 Choi ........................... 455/115

FOREIGN PATENT DOCUMENTS

WO  WO 90/04293  * 4/1990 ............ H04B/7/24

* cited by examiner

Primary Examiner—Quochien B. Vuong
(74) Attorney, Agent, or Firm—Duane Morris LLP

(57) ABSTRACT

A novel wireless point to multipoint communication system which maximizes the number of remote stations capable of communicating with a base station is disclosed. Independent gain control of the transmitter on the remote stations as a function of the distance between the remote station and the base station is used. The gain control may be accomplished by attenuators in the RF transmit circuit of the remote stations. The attenuators may be placed immediately preceding the RF amplifiers in the RF transmit circuit of the remote stations. The amount of attenuation of the attenuators may be controlled by a microprocessor. By minimizing the gain from the remote station transmitters, the noise floor of the base station receiver is minimized thereby increasing the performance of the base station receiver. This increase in performance permits more remote stations to communicate with the base station.

25 Claims, 4 Drawing Sheets

TRANSMITTER CIRCUIT ARCHITECTURE AND METHOD FOR REDUCING IN-BAND NOISE IN POINT TO MULTIPOINT COMMUNICATION SYSTEMS

BACKGROUND OF THE INVENTION

Typical prior art point to multipoint communication systems comprising a base station and plural remote stations typically adjust the gain of the transmitter on each remote station to the same value. The value for transmitter gain is typically based on the distance of the furthest remote from the base station, i.e., the highest gain value, so that the base station is ensured to be able to communicate with the furthest remote. Setting transmitter gain to an identical value for all remote stations in a communication system is common practice for prior art broadband wireless access systems. Such a prior art transmitter gain scheme allows for communications between the furthest remote and the base station without having to modify individual transmitters when the remote station transmitters are placed in the field. While this scheme allows for commonality between all the remote station transmitters in the communication system, the scheme results in a poor inband noise figure for the receiver at the base station thereby limiting the number of remote stations that can communicate with the base station.

One embodiment of the present invention avoids the problems of the prior art by the use of a novel wireless point to multipoint communication system which maximizes the number of remote stations capable of communicating with a base station. The present invention allows for more remote stations by minimizing the inband noise floor of the base station receiver.

The inband noise floor of the base station receiver is affected by, among other things, the strength of the signals in the frequency band of interest received from the remote stations with which the base station communicates. Prior art systems adjust the gain of the remote station transmitters to be the same value regardless of the distance between an individual remote station and the base station. The gain is typically set at a value to allow the remote station that is furthest from the base station to be able to communicate with the base station, which results in a gain setting for the other remote stations that are closer to the base station than the furthest remote station to have a transmitter gain setting that is higher then necessary to communicate with the base station. The higher gain setting for the closer-in remote stations results in an "excess inband signal strength" seen by the receiver at the base station from the closer-in remote stations. The excess inband signal strength causes the inband noise floor of the base station receiver to increase. This increase in the inband noise floor effectively limits the number of remote stations with which the base station can communicate.

The present invention discloses a system and method for independent gain control of the transmitter on a particular remote station as a function of the distance between that remote station and the base station. Independent gain control eliminates the excess inband signal strength thereby allowing for an increase in the number of remote stations with which the base station can communicate. One embodiment of the present invention accomplishes gain control of the remote station transmitters by including attenuators in the RF transmit circuit of the remote stations. Any number of attenuators may be added to the RF transmit circuit as contemplated by the present invention. The attenuators may be placed anywhere in the RF transmit circuit but preferentially are placed immediately preceding the RF power amplifier in the RF transmit circuit. The amount of attenuation that the attenuators may add to the RF transmit circuit may be variable and may be controlled by a microprocessor. In one embodiment of the present invention, a value representing the amount of attenuation to be applied to a remote station transmitter is input into a look up table at the remote station. A microprocessor at the remote station accesses the value in the look up table and sends a control signal to an attenuator in the RF signal path of the remote station transmitter to control the amount of attenuation that the attenuator adds to the RF signal path. Therefore, the amount of attenuation added to the RF signal path is a function of the distance between the remote station and the base station.

Accordingly, it is an object of the present invention to provide a novel wireless point to multipoint communication system where ones of plural remote stations utilize transmitter gain control.

It is another object of the present invention to provide a novel wireless point to multipoint communication system where ones of plural remote stations utilize transmitter gain control as a function of the distance of the remote to the base station.

It is yet another object of the present invention to provide a novel wireless point to multipoint communication system where gain control of the remote stations is achieved by placing high frequency attenuators in the RF transmit path.

It is still another object of the present invention to provide a novel RF transmission circuit where controllable attenuators are placed in the RF transmit path immediately preceding the RF amplifiers.

It is a further object of the present invention to provide a novel RF transmission circuit where a microprocessor controls the amount of attenuation of attenuators placed in the RF transmit path.

It is yet a further object of the present invention to provide a novel wireless point to multipoint communication system for millimeter wave communication signals where ones of plural remote stations utilize transmitter gain control.

It is still a further object of the present invention to provide a novel wireless point to multipoint communication system for transmitting communication signals in the 3.4 to 3.7 GHz frequency range where ones of plural remote stations utilize transmitter gain control as a function of the distance of the remote to the base station.

It is an additional object of the present invention to provide a novel wireless point to multipoint communication system for millimeter wave communication signals where ones of plural remote stations utilize transmitter gain control to maximize the number of remote stations that can communicate with a base station.

It is yet an additional object of the present invention to provide a novel wireless point to multipoint communication system for millimeter wave communication signals where ones of plural remote stations utilize transmitter gain control to maximize the number of remote stations that can communicate with a base station by minimizing the noise floor of the receiver at the base station.

It is still an additional object of the present invention to provide a novel wireless point to multipoint communication system where ones of plural remote stations utilize transmitter gain control as a function of the distance of the remote to the base station where the gain control of the transmitter of each remote station can be adjusted independently of the gain control of the transmitter of other remote stations.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
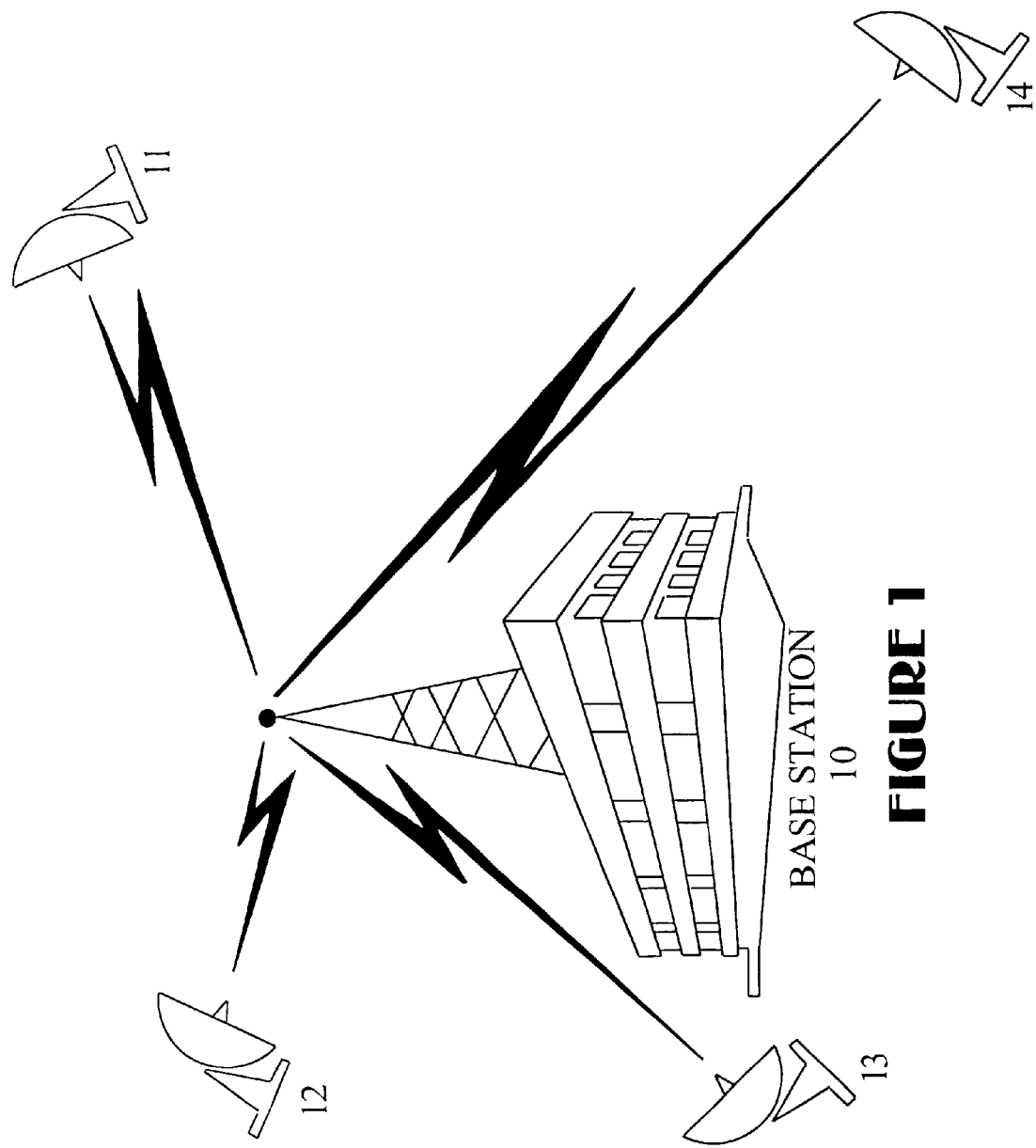
FIG. 1 is a depiction of a wireless point to multipoint communication system with a single base station and plural remote stations in which the present invention may be used.

With reference to FIG. 1, a depiction of a typical wireless point to multipoint communication system with a single base station and plural remote stations is shown. The base station 10 communicates via a wireless communication link with each of the remote stations 11, 12, 13, and 14. It is to be understood that while only four remote stations are shown in FIG. 1, the invention is not necessarily limited to a communication system with only four remote stations. A communication system in accordance with the present invention comprising more than four remote stations is contemplated. The number of remote stations that can communicate with the base station is a function of, among other things, the inband noise floor of the receiver at the base station. The present invention minimizes the inband noise floor to allow a maximum number of remote stations to communicate with the base station as described below.

The base station 10 includes a transmitter for transmitting a communication signal to one or more of the remote stations, and a receiver for receiving communication signals from the remote stations. Each of the remote stations 11, 12, 13, and 14 include a receiver for receiving a communication signal transmitted by the base station, and a transmitter for transmitting a communication signal to the base station. The remote station transmitters each include an RF transmit circuit, known as an RF transmit path, which increases the frequency of an intermediate frequency communication signal to RF frequencies, amplifies the RF communication signal, and transmits the RF communication signal. The RF amplifiers in the RF transmit path amplify the RF communication signal. The RF communication signal can be any type of communication signal which is known to one of skill in the art, such as, but not limited to, code division multiple access ("CDMA"), time division multiple access ("TDMA"), or time division multiplexed ("TDM"). The type of information in the communication signal can be of any type, such as, but not limited to, data, voice, video, multimedia, or any combination thereof.

Prior art communication systems and broadband wireless access systems typically set the amount of gain for the RF transmitter in each remote station based on the distance between the furthest remote station and the base station. In FIG. 1, the gain for the RF transmitter in the remote stations 11, 12, and 13, according to the prior art, would be the same as the gain for the RF transmitter in the remote station 14, even though the gain for the RF transmitter in the remote stations 11, 12, and 13 may not necessarily need to be set as high as the gain for the RF transmitter in the remote station 14.

Figure 2:
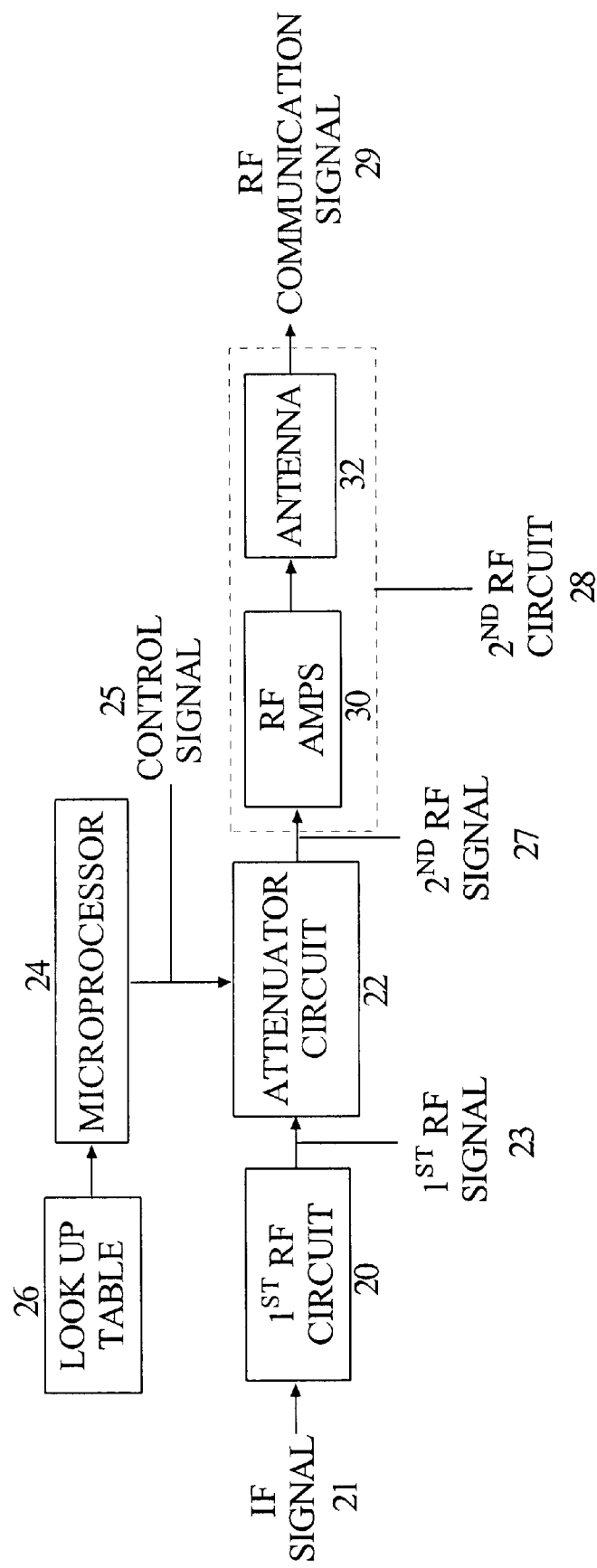
FIG. 2 is a functional block diagram of the transmitter circuit for a remote station indicating the location of the attenuators immediately prior to the RF amplifiers and controlled by a microprocessor according to the present invention.

With reference to FIG. 2, the RF transmit path for a remote station transmitter, in accordance with an embodiment of the present invention, is depicted in a functional block diagram. The intermediate frequency ("IF") signal 21 is input into the first RF circuit 20 which produces the first radio frequency ("RF") signal 23. The IF signal 21 may contain any type of digitized data such as, but not limited to, data, voice, video, multimedia, or any combination thereof. The first RF signal 23 is typically a representation of the IF signal 21, including the data encoded in the signal, but the RF signal is at a higher frequency. The first RF circuit 20 may contain any combination of oscillators, filters, buffers, synthesizers, mixers, and other components as would appear in any circuit known in the art to transform an IF signal in a radio transmitter to an RF signal. The first RF signal 23 is input into the attenuator circuit 22. The attenuator circuit may contain one or more attenuators. The attenuator circuit also includes standard means for adjusting the amount of attenuation of the attenuators. The control signal 25 is provided by the microprocessor 24 and the control signal 25 is also input into the attenuator circuit 22. The look up table 26 may contain information representative of the distance between the remote station and a base station with which the remote station communicates via a wireless radio link. The lookup table is operatively connected to the microprocessor. In one embodiment of the present invention, the microprocessor 24 provides a control signal to the attenuator circuit 22 as a function of the information contained in the lookup table 26. The attenuator circuit 22 produces the second RF signal 27 which is provided to the second RF circuit 28. In one embodiment of the present invention, the attenuators are placed in the later stages of the transmit path in order to maximize the benefit of the attenuation of the RF signal being processed through the transmit path. The benefit of the attenuation is maximized since the gain after the attenuators cannot be reduced. The second RF circuit may contain one or more RF amplifiers 30 and an antenna 32. The antenna is typically directional and pointed towards the base station with which the remote station communicates. It is to be understood that any type of antenna will work with the present invention. The second RF circuit 28 amplifies the second RF signal 27 and antenna 32 transmits the RF communication signal 29.

With continued reference to FIG. 2, the operation of the depicted remote station RF transmitter is as follows. The IF signal 21 is provided to the first RF circuit 20 which produces a first RF signal 23. The IF signal, in one embodiment of the present invention, is in the range of 40–48 MHz and is preferably 44 MHz. The first RF signal is typically a higher frequency representation of the IF signal and is in the range of 3.4–3.7 GHz and is preferably 3.5 GHz. The first RF signal 23 is provided to the attenuator circuit 22 which produces the second RF signal 27 responsive to the first RF signal 23 and the control signal 25. The frequency of the second RF signal is approximately the same as the frequency of the first RF signal. The microprocessor 24 retrieves information related to the distance from the remote station to the base station from the lookup table 26. The distance information in the lookup table is typically entered into the lookup table at or about the time the remote station is physically put in place, although the distance information in the lookup table may be entered at any time. Generally, the distance information is entered into the lookup table prior to the initiation of the transmission sequence being now described. The microprocessor provides a control signal 25 to the attenuator circuit 22 as a function of the distance information in the lookup table 26. Therefore, at least one attribute of the control signal 25 is a function of the distance of the remote station to the base station. As described above, the attenuator circuit 22 includes at least one attenuator where the amount of attenuation of one or more of the at least one attenuators is adjustable in response to the control signal 25. Therefore, the amount of attenuation added by the attenuator circuit 22 is controlled by the microprocessor 24 via the control signal 25 as a function of the distance between the remote station and the base station.

By controlling the amount of attenuation added to the RF transmit path, the inband noise level performance of the base station transmitter is improved (see FIG. 3 as discussed below) which has the effect of increasing the performance of the base station receiver thereby allowing for more remote stations to communicate with the base station. The present invention allows the transmitter of each remote station of a communication system to be individually adjusted so that the gain of the transmitted RF communication signal is sufficiently high for reliable communication with the base station yet not too high to result in a poor inband noise figure and thereby degrade the performance of the base station receiver. For example, for the remote station 12 of FIG. 1, which is closer to the base station 10 than the remote station 14, the amount of attenuation to be added to the transmitter for the remote station 12 will be more than the amount of attenuation to be added to the transmitter of the remote station 14.

Still with continued reference to FIG. 2, the second RF signal 27 is provided to the second RF circuit 28. The second RF circuit may contain at least one RF amplifier 30 and an antenna 32. The second RF circuit produces and transmits, in response to the second RF signal 27, the RF communication signal 29. The RF communication signal 29 is approximately the same frequency as the second RF signal 27 and is a higher frequency representation of the IF signal 21, including the data encoded within the IF signal, as is standard in the art.

Figure 2A:
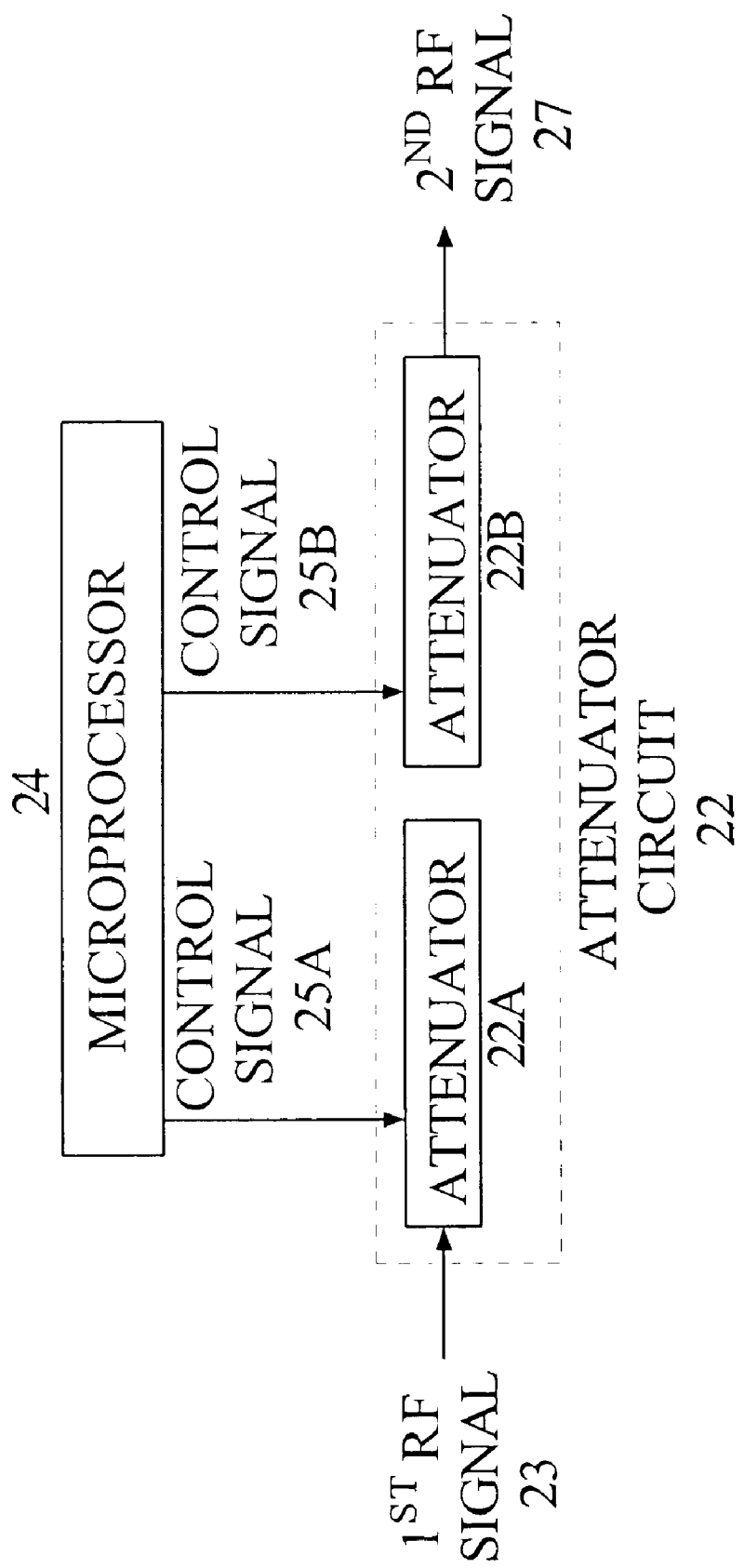
FIG. 2A is a function block diagram of the attenuator circuit of FIG. 2 according to one embodiment of the present invention.

With reference now to FIG. 2A where like components have like numbers, the attenuator circuit 22 is shown in functional block diagram format with the respective input and output signals. In this embodiment the attenuator circuit 22 includes two attenuators, the attenuator 22A and the attenuator 22B, where the amount of attenuation of the attenuators is responsive to the control signal 25A and the control signal 25B, respectively, as described above. The microprocessor 24 provides the control signals 25A and 25B which may be the same or different.

Figure 3:
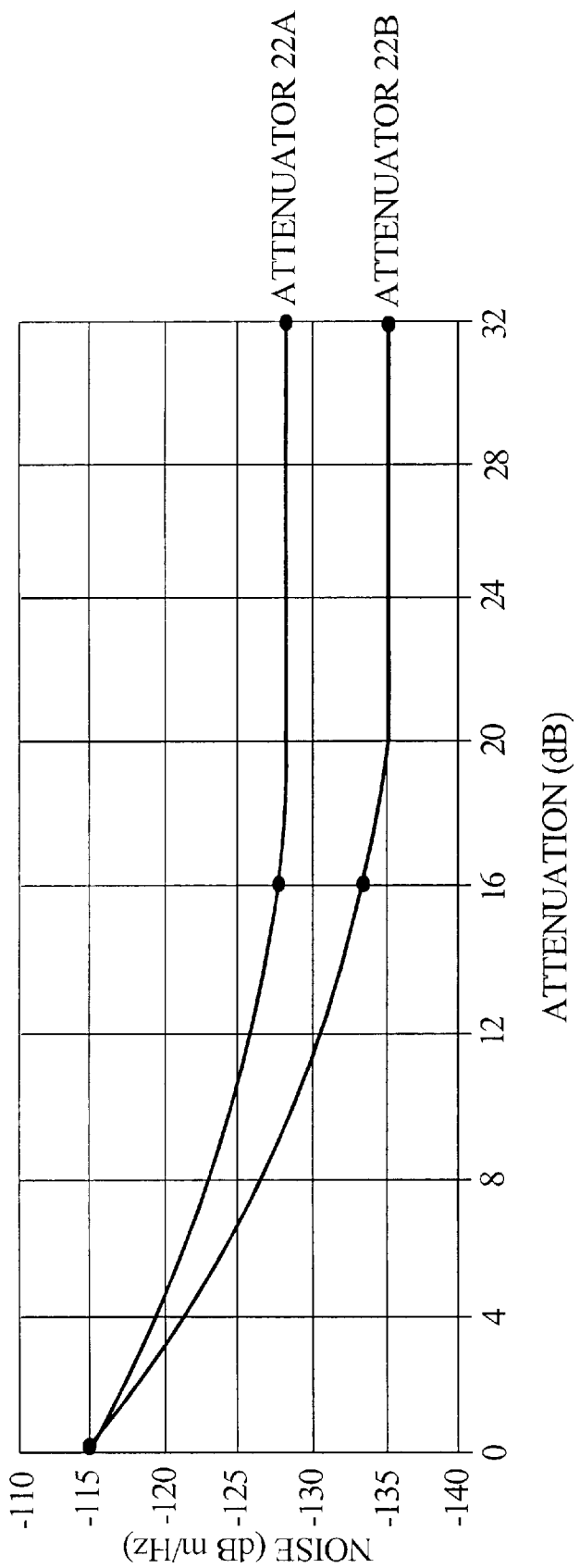
FIG. 3 is a graphical display showing a decrease of inband noise as a function of the attenuation setting on a set of two attenuators according to the embodiment of the present invention in FIG. 2A.

With reference now to FIG. 3, the graphical display shows the inband noise performance of a remote station transmitter for various attenuator settings. For FIG. 3, the attenuator circuit 22 includes two attenuators, the attenuator 22A and the attenuator 22B, as shown in FIG. 2A. The vertical axis of FIG. 3 is an inband noise parameter measured in decibel-milliwatts per hertz (dBm/Hz). The horizontal axis of FIG. 3 is the attenuation added by the attenuators in decibels (dB). The upper curve on the graph is representative of the effect on the inband noise parameter due to the attenuation setting of the attenuator 22A. The lower curve on the graph is representative of the effect on the inband noise parameter due to the attenuation setting of attenuator 22B. It should be noted that as the attenuation of either of the attenuators increases (from left to right on the horizontal axis) the inband noise parameter decreases (becomes more negative).

By controlling the inband noise parameter individually for each remote station in a point to multipoint wireless communication system, the noise floor of the receiver at the base station is lowered thereby increasing the performance of the base station receiver. This increase in performance permits more remote stations to communicate with the base station.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a wireless point to multipoint communication system having a base station and a plurality of stationary remote stations each having an RF transmitter circuit including a transmitter for transmitting an RF communication signal to the base station, said plurality of remote stations being located at various distances from the base station, where each one of the plurality of remote stations communicate with the base station by the method of transmitting an RF communication signal with substantially the same amount of gain, the improvement comprising the steps of:

(a) providing transmitter gain control for a first set of remote stations of said plurality of remote stations; and (b) selectively adjusting the transmitter gain control of each one of said first set of remote stations independent of the transmitter gain control of the other ones of said first set of remote stations, wherein the transmitter gain control of a one of said first set of remote stations is selectively adjusted as a function of the distance between said one of the first set of remote stations and the base station and wherein said distance information is stored in a lookup table at the remote station.

2. The method of transmitter gain control of claim 1 further comprising for each one of said first set of remote stations, the steps of:

(c) providing a high frequency attenuator circuit in the RF transmitter circuit;

(d) selectively controlling the amount of attenuation of the high frequency attenuator circuit as a function of the distance between the remote station and the base station, thereby controlling transmitter gain.

3. The method of transmitter gain control of claim 2 wherein the RF transmitter circuit includes RF amplifiers and the high frequency attenuator is disposed in the RF transmit circuitry path immediately preceding the RF amplifiers.

4. The method of transmitter gain control of claim 3 wherein the step of selectively controlling the amount of attenuation for each one of said first set of remote stations includes the steps of:

(e) providing a lookup table including information representative of the distance between the remote station and the base station;

(f) providing a microprocessor for sending a control signal to the high frequency attenuator circuit wherein said control signal is a function of the distance between the remote station and the base station;

(g) controlling the amount of attenuation of the high frequency attenuator circuit in response to said control signal, thereby selectively controlling the amount of attenuation of the high frequency attenuator circuit.

5. The method of transmitter gain control of claim 1 wherein the transmitters for said plurality of stationary remote stations are substantially identical.

6. The method of transmitter gain control of claim 1 wherein said RF communication signal is a millimeter wave signal.

7. The method of transmitter gain control of claim 6 wherein said millimeter wave signal is at 3.5 GHz.

8. The method of transmitter gain control of claim 6 wherein said millimeter wave signal is in the range of 3.4–3.7 GHz.

9. A wireless point to multipoint communication system comprising:
   a base station including an antenna;
   a plurality of stationary remote stations each including an antenna and a transmitter for transmitting an RF communication signal from the remote station antenna to the base station antenna, said plurality of remote stations being located at various distances from the base station;
   a first set of said plurality of remote stations including an antenna and a transmitter, the transmitter of each one of said first set of remote stations comprising:
      a first RF circuit adapted to receive an intermediate frequency signal and capable of providing a first RF signal;
      a lookup table for storing information representative of the distance between the remote station and the base station;
      a microprocessor operatively connected to the lookup table and an attenuator circuit, said microprocessor capable of providing a control signal to said attenuator circuit, said control signal being a function of the information stored in the lookup table;
      said attenuator circuit operatively connected to the microprocessor, the first RF circuit and a second RF circuit such that the attenuator circuit modifies the first RF signal as a function of the control signal to thereby provide a second RF signal to the second RF circuit;
      said second RF circuit operatively connected to the attenuator and the antenna, said second RF circuit amplifying the second RF signal to provide a third RF signal to the antenna; and
      said antenna providing said RF communication signal in response to the second RF signal and transmitting said RF communication signal to the base station antenna.

10. The wireless point to multipoint communication system of claim 9 where the second RF circuit includes RF frequency amplifiers.

11. The wireless point to multipoint communication system of claim 9 wherein the intermediate frequency signal is approximately 44 MHz.

12. The wireless point to multipoint communication system of claim 9 wherein the intermediate frequency signal is in the range of 40–48 MHz.

13. The wireless point to multipoint communication system of claim 9 wherein the second RF signal is approximately 3.5 GHz.

14. The wireless point to multipoint communication system of claim 9 wherein the second RF signal is in the range of 3.4–3.7 GHz.

15. The wireless point to multipoint communication system of claim 9 wherein the RF communication signal is approximately 3.5 GHz.

16. The wireless point to multipoint communication system of claim 9 wherein the RF communication signal is in the range of 3.4–3.7 GHz.

17. The wireless point to multipoint communication system of claim 9 wherein the RF communication signal is a millimeter wave signal.

18. In a wireless point to multipoint communication system comprising a base station including an antenna and a receiver and a plurality of remote stations each having an RF transmitter circuit including an antenna and a transmitter, the method of maximizing the number of remote stations that can communicate with the base station by minimizing the noise floor of the receiver at the base station comprising the steps of:
   (a) providing transmitter gain control for a first set of remote stations of said plurality of remote stations;
   (b) selectively adjusting the transmitter gain control of each one of said first set of remote stations independent of the transmitter gain control of the other ones of said first set of remote stations, wherein the transmitter gain control of a one of said first set of remote stations is selectively adjusted as a function of the distance between said one of the first set of remote stations and the base station to thereby minimize the noise floor of the receiver at the base station to thereby maximize the number of remote stations that can communicate with the base station and wherein said distance information is stored in a lookup table at the remote station.

19. The method of maximizing the number of remote stations that can communicate with the base station of claim 18 further comprising for each one of said first set of remote stations, the steps of:
   (c) providing a high frequency attenuator circuit in the RF transmitter circuit;
   (d) selectively controlling the amount of attenuation of the high frequency attenuator circuit as a function of the distance between the remote station and the base station,
   thereby minimizing the noise floor of the receiver at the base station to thereby maximize the number of remote stations that can communicate with the base station.

20. The method of transmitter gain control of claim 19 wherein the RF transmitter circuitry path includes RF amplifiers and the high frequency attenuator is disposed in the RF transmitter circuit immediately preceding the RF amplifiers.

21. The method of transmitter gain control of claim 20 wherein the step of selectively controlling the amount of attenuation for each one of said first set of remote stations includes the steps of:
   (e) providing a lookup table including information representative of the distance between the remote station and the base station;
   (f) providing a microprocessor for sending a control signal to the high frequency attenuator circuit wherein said control signal is a function of the distance between the remote station and the base station;
   (g) controlling the amount of attenuation of the high frequency attenuator in response to said control signal,
   thereby selectively controlling the amount of attenuation of the high frequency attenuator circuit.

22. The method of transmitter gain control of claim 18 wherein the transmitters for said plurality of stationary remote stations are substantially identical.

23. The method of transmitter gain control of claim 18 wherein said RF communication signal is a millimeter wave signal.

24. The method of transmitter gain control of claim 23 wherein said millimeter wave signal is at 3.5 GHz.

25. The method of transmitter gain control of claim 23 wherein said millimeter wave signal is in the range of 3.4–3.7 GHz.

* * * * *